United States Patent [19]

Nagai et al.

[11] Patent Number: 4,627,828
[45] Date of Patent: Dec. 9, 1986

[54] TOOTHED BELT

[75] Inventors: Takaji Nagai; Hiroyuki Ookawa; Takahide Mizuno; Fumihito Nakagawa; Yoshiaki Onaka, all of Hyogo, Japan

[73] Assignee: Mitsuboshi Belting Ltd., Hyogo, Japan

[21] Appl. No.: 583,465

[22] Filed: Feb. 24, 1984

[30] Foreign Application Priority Data

Oct. 7, 1983 [JP] Japan .................... 58-156626[U]

[51] Int. Cl.$^4$ .............................................. F16G 1/08
[52] U.S. Cl. ................................................. 474/205
[58] Field of Search .............. 474/205, 204, 262, 264, 474/266, 268, 202, 260

[56] References Cited

U.S. PATENT DOCUMENTS 2,182,461 12/1939 Yeakel .................................... 474/205
2,988,925 6/1961 Sauer ..................................... 474/205
4,099,422 7/1978 Cicognani et al. .................. 474/205

FOREIGN PATENT DOCUMENTS 0128547 8/1983 Japan .................................... 474/205

Primary Examiner—Stephen J. Novosad
Assistant Examiner—Thuy M. Bui
Attorney, Agent, or Firm—Sughrue, Mion, Zinn, Macpeak, and Seas

[57] ABSTRACT

A toothed drive belt having inner and outer reinforcing fabric layers. The inner layer has a large mesh size, is highly stretchable, has a fine warp of 30 to 210 d, has a normal weft, and the sum of the cover factors of the warp and weft are no more than 20. The inner layer may have either a flat or a wavy shape within the teeth. The outer layer has a low stretchability and a normal warp and weft. The inner layer, which is bonded strongly to the rubber substrate of the belt due to its large mesh size, easily follows the deformations of the teeth. Due to a small thread size, the amount of PLD is reduced.

9 Claims, 9 Drawing Figures

TOOTHED BELT

BACKGROUND OF THE INVENTION

The present invention relates to a toothed belt. More particularly, the invention relates to a toothed belt having teeth having improved durability.

A toothed belt transmits power via teeth which engage with the teeth of a pulley. A high shearing stress acts on the teeth of the belt at the point where they engage with the teeth of the pulley. The fewer the number of teeth on a belt, the greater the stress, as indicated by the graph of FIG. 1. This effect deforms the teeth, resulting in wear and damage to the belt.

In order to overcome this problem, it has been the practice to increase the hardness of the teeth to thereby reduce the amount of deformation and hence improve the durability of the belt. However, because a great deal of heat is generated when a large load is repeatedly applied to the teeth as they repeatedly engage the teeth of the pulley as the belt is rotated, the polymer material of which the hardened teeth were ordinarily fabricated tended to crack. Hence, merely increasing the hardness of the belt was not sufficient by itself to overcome the above-mentioned problem.

Another approach aimed at improving the shear resistance of the teeth of a toothed belt has been to employ a multilayer-fabric structure for the teeth. This approach also suffers from certain drawbacks, which include:

(a) If two or more fabric layers are employed, PLD, which stands for pitch line difference, increases, and the wear of the teeth is accelerated due to interference between the teeth and the pulley at the time that the teeth engage with the pulley. PLD can be reduced by employing a thin fabric layer. Doing so, however, unavoidably reduces the wear resistance of the belt.

(b) If two or more fabric layers are employed, it is necessary to provide strong bonding between the fabric layers. However, it is necessary that the thickness of the rubber between the two fabric layers be small to avoid PLD problems. Moreover, the fabric layers can separate due to the heat generated by the repeated stressing of the teeth of the belt, leading to failure of the belt.

(c) Still another approach, as disclosed in Japanese Published Patent Application No. 30135/1980, is to employ two or more layers of a rigid fabric. Although this approach may result in a lowered deformation of the teeth, the amount of shear stress on the teeth is increased. Also, the possibility of separation between a fabric layer and the rubber material of the belt increases as the hardness of the fabric increases. Because, when an extraordinary large stress is applied to the belt, the tooth is largely deformed but the rigid fabric layer disposed on the rubber material is not deformed in the same way as the tooth.

With reference now to FIG. 2, which shows in cross section a segment of a toothed belt employing fabric layers, if a tooth T undergoes a large deformation, a fabric layer C will not completely follow the deformation of the tooth, and hence separation of the rubber R of the belt and the fabric layer C can occur. In order to prevent this problem, a fabric which is easily deformable and which has a large stretchability can be employed. On the other hand, employing a fabric having a large stretchability leads to crack formation at the base of the teeth T due to the large amount of deformation which the tooth will inevitably undergo.

SUMMARY OF THE INVENTION

Accordingly, it is an object of the present invention to provide a toothed belt which is free from the drawbacks mentioned above. Specifically, it is a primary object of the present invention to provide a toothed belt employing a multilayer fabric arrangement which has improved durability.

In accordance with the above and other objects of the present invention, there is provided a toothed belt having two fabric layers of different stretchability. The two fabric layers are laminated and bonded to the surface of the rubber material of the teeth of the belt. It has been found that this structure both reduces the amount of deformation of the teeth of the belt and also increases the wear resistance of the belt.

DESCRIPTION OF THE PREFERRED EMBODIMENTS

Preferred embodiments of toothed belts constructed in accordance with the present invention will now be be described with reference to the accompanying drawings.

Figure 1:
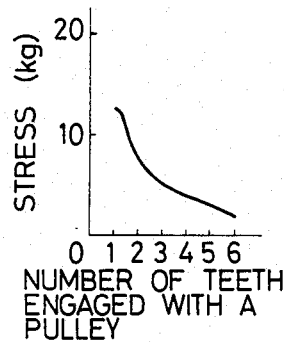
FIG. 1 is a graph showing the relationship between the number of teeth on a belt engaged with a pulley and the shear stress acting on the teeth.
Figure 2:
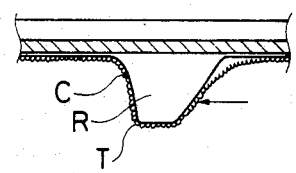
FIG. 2 is a cross-sectional side view showing the deformed state of a conventional toothed belt having a fabric layer.
Figure 3:
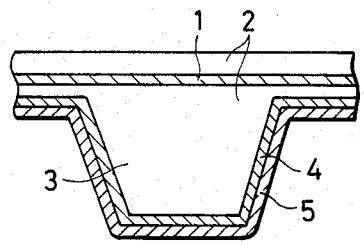
FIG. 3 is a cross-sectional side view showing a toothed belt constructed in accordance with a first preferred embodiment of the invention.

Referring now to the cross-sectional view of FIG. 3, a first embodiment of a toothed belt constructed in accordance with the teachings of the present invention will now be described. Reference numeral 1 designates a reinforcing cord formed of polyester, nylon, aromatic polyamide, rayon or glass fiber and embedded in a rubber layer 2. The rubber layer 2 may be formed of natural rubber, one or a blend of various synthetic rubbers or urethane elastomer. Further, reference numeral 3 designates a tooth which is integral with the rubber layer 2.

On the surface of the tooth 3 are laminated and bonded an inner fabric layer 4 and an outer fabric layer 5, the construction of which is one of the primary features of the present invention. The warp of the inner fabric layer 4 is formed by threads made of nylon, polyester or aromatic polyamide filamentary or spun yarn, crimped yarn or core yarn, and which are very thin, typically 30 to 210 d. The weft of the layer 4 is formed of the same material. The sum of the cover factors of the warp and weft should be 20 or less, that is, the surface of the layer 4 should be relatively rough. The stretchability of the layer 4 should be in a range of 67 to 430%.

through to permit a sufficient degree of bonding to the rubber substrate of the belt.

Table 1 below shows some specific examples of toothed belts constructed in accordance with the present invention.

TABLE 1

| Class | Belt of the Invention (two fabric layers) | | | | Conventional Belt | |
|---|---|---|---|---|---|---|
| | Inner Layer | | Outer Layer | | Conventional Fabric | |
| Structure of Fabric | Warp Dir. | Weft Dir. | Warp Dir. | Weft Dir. | Warp Dir. | Weft Dir. |
| | $N_{30}D/1$ | $\times$ $N_{30}D/1$ | $N_{40}D/5$ | $\times$ $N_{210}D/1$ | $N_{40}D/5$ | $\times$ $N_{210}D/1$ |
| | $110 \times 90/5$ cm | | $150 \times 125/5$ cm | | $180 \times 125/5$ cm | |
| Cover Factor | 4.2 | 3.4 | 14.8 | 12.6 | 17.7 | 12.6 |
| Elongation (%) | 230 | — | 120 | — | 120 | — |

The warp and weft of the outer layer 5 are formed of twisted yarns of nylon, polyester or aromatic polyamide and are relatively thick, preferably, 200 to 800 d. The cover factors of the warp and weft of the outer layer 5 should be larger than those of the warp and weft of the inner layer 4. The stretchability of the outer layer 5 should be in the range of 42 to 370%. As shown in FIG. 3, the outer layer 5 should cover the inner layer 4.

With this construction with the inner layer 4 having a rough surface and a greater stetchability than the outer layer 5 but the outer layer 5 being thicker than the inner layer 4, the outer layer 5 is strongly bonded to the rubber 3 through the inner layer 4. Accordingly, the teeth of the belt can undergo a large amount of deformation with very little wear.

The cover factor mentioned above relates to the density of the yarn used to form the warp or weft. The cover factor CF is obtained by dividing the number n of threads per inch by the square root of the yarn number N, that is, $CF = n/\sqrt{N}$.

Figure 4:
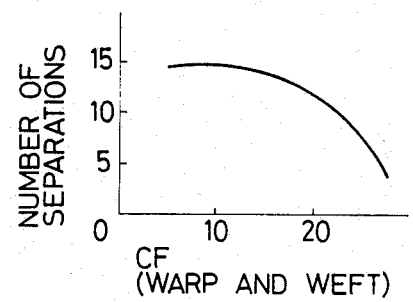
FIG. 4 is a graph showing the relationship between the sum of cover factors of the warp and weft of a fabric and the number of separations of the layers of the belt.

The relationship between the density of the fabric and the average time before separation for a fixed, predetermined load is shown by the graph of FIG. 4. More specifically, as shown in FIG. 4, if the sum of the cover factors of the warp and weft of the inner layer 4 is greater than about 20, the densities of the warp and weft become particularly large. In such a case, the bonding between the outer layer 5 and the rubber 3 is markedly reduced.

The precise values of the stretchabilities of the two layers should be chosen in accordance with the type of rubber employed, the shape of the teeth, the number of teeth on the belt, and the loading conditions which the belt is expected to endure. Typical values of the stretchabilities of the inner and outer layers are 220% and 130%, respectively.

If more than two fabric layers are provided, the overall thickness of the fabric layers is unavoidably increased, resulting in an increase in PLD. If a standard ISO pulley is used with a belt having more than two fabric layers, the belt tends to wear rapidly.

The precise thicknesses of the two layers should be chosen in accordance with the tooth shape.

To fabricate the belt of the invention, first the inner and outer fabric layers are coated with a layer of 3 to 30% rubber paste. After being laid on the rubber material of the belt, heat or a solvent is applied to effect bonding between the two fabric layers and the rubber material. Pressurized bonding may be used. The mesh openings in the two fabric layers should, of course, be sufficiently big to allow fluidized rubber to flow therethrough to permit a sufficient degree of bonding to the rubber substrate of the belt.

Figure 5:
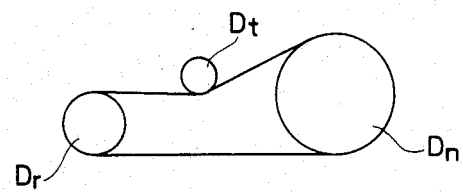
FIG. 5 is a schematic view of a drive testing machine for toothed belts.

A belt constructed in accordance with the invention was compared with a conventional belt using a testing machine as illustrated in FIG. 5. The number of teeth on the two pulleys $D_r$ and $D_n$ were 20 and 40, respectively. Conditions employed were a speed of 7,000 r.p.m., a load of 5 horsepower, and 80° C. ambient temperature. It was found that the belt of the invention had about 1.5 times the lifetime of 1,200 hours of the conventional belt.

Figure 6:
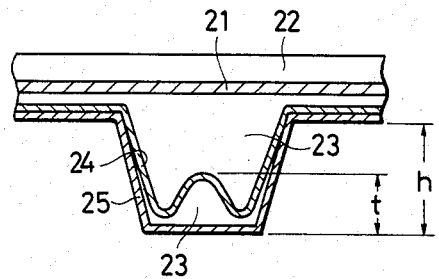
FIG. 6 is a cross-sectional view of another embodiment of a toothed belt of the invention.
Figure 7:
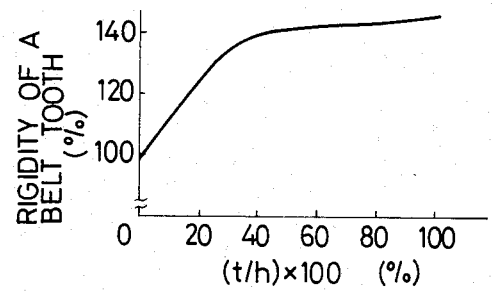
FIG. 7 is a graph showing the relationship between the height of undulations of a fabric layer and the rigidity of a belt tooth.

Another embodiment of a belt of the invention is seen in the cross-sectional view of FIG. 6. In FIG. 6, reference numerals 21 through 25 designate elements in common with the first preferred embodiment of the invention described above. However, in the embodiment of FIG. 6, the inner fabric layer 24 has an undulated shape in the longitudinal direction of the belt. As indicated by the graph of FIG. 7, the rigidity (Young's modulus) of the teeth of the belt increases as the height t of the undulations is increased, thereby increasing the expected lifetime of the belt due to reduced wear at the teeth. On the other hand, if the height of the undulations is excessively increased, the amount of heat generated in the teeth will be excessive, leading to separation of the fabric layers from the rubber substrate of the belt.

Figure 8:
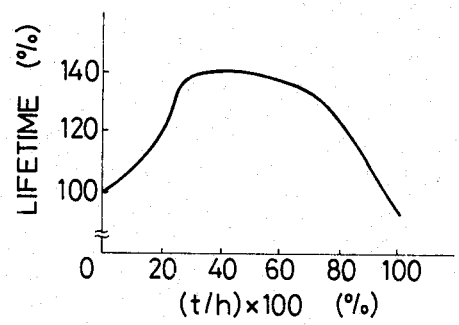
FIG. 8 is a graph showing the relationship between the height of undulations of a fabric layer and the expected lifetime of the belt.

Belts of the invention having a varied undulation height t and the properties listed in Table 1 above were built and tested. Test conditions were 7,000 r.p.m., 7 horsepower, and 80° C. ambient temperature. The results of these tests are shown graphically in FIG. 8. As FIG. 8 demonstrates, the lifetime of the belt can be markedly improved by restricting the height of the undulations to a specific range. More particularly, it was found that to ratio t/h should preferably be in a range of 20 to 70%, where h represents the height of the teeth.

Figure 9:
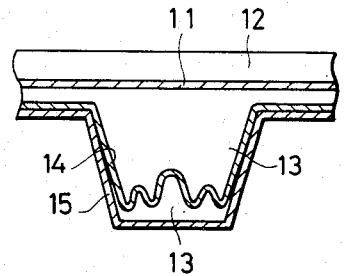
FIG. 9 is a cross-sectional side view showing a still further embodiment of a toothed belt of the invention.

The belts tested had the shape of undulations shown in FIG. 6. However, the invention is not limited to that particular shape. Particularly, it is possible to employ multiple undulations in a single tooth. Such an embodiment is illustrated in FIG. 9.

As described above, in accordance with the invention, a drive belt is provided having inner and outer reinforcing fabric layers. Of these, the inner layer has a larger mesh size than the outer layer, and also a greater stretchability. The inner fabric layer has a fine warp of 30 to 210 d and a normal weft. The sum of the cover factors of the warp and weft of the inner fabric layer is less than or equal to 20. The outer layer, which has a relatively low stretchability, has a normal warp and weft. Because of its rough mesh, the inner layer is very firmly bonded to the rubber substrate of the belt. The inner layer can easily follow the deformation of the teeth, but the outer layer is relatively rigid. This reduces PLD and prevents wear of the outer surfaces of the teeth. The belt of the invention achieves an increased expected lifetime due to a reduction in cracking and wear, even under high load conditions.

This completes the description of the preferred embodiments of the invention. Although preferred embodiments have been described, numerous alterations and modifications can be made thereto without departing from the spirit and scope of the invention.

We claim:

1. A toothed belt comprising: a rubber substrate in which a plurality of teeth are formed; an inner fabric layer covering said teeth, said inner fabric layer having a large mesh size, large stretchability, a warp of 30 to 210 d, a normal weft, and a sum of cover factors of said warp and weft of no more than 20; and an outer fabric layer outside of and covering said inner fabric layer.

2. The toothed belt of claim 1, wherein said inner layer has a substantially flat shape within each tooth of said belt.

3. The toothed belt of claim 1, wherein said inner fabric layer has an undulated shape within each tooth of said belt.

4. The toothed belt of claim 3, wherein a ratio of a height of undulations of said inner fabric layer to a height of said teeth is in a range of 20 to 70%.

5. The toothed belt of claim 3, wherein said outer fabric layer exhibits a substantially flat shape in the region where said inner layer has said undulated shaped, such that a substantial spacing is created between said inner and outer layers at least in the region of said undulated shape.

6. The toothed belt of claim 1, wherein said warp of said inner fabric layer is constructed of threads formed of a material selected from the group consisting of filamentary twisted yarn, spun twisted yarn, crimped filamentary twisted yarn, crimped spun twisted yarn, core filamentary twisted yarn, and core spun twisted yarn.

7. The toothed belt of claim 6, wherein said yarns are formed of a meterial selected from the group consisting of nylon, polyester and aromatic polyamide.

8. The toothed belt of claim 6, wherein said weft of said inner fabric layer is constructed of threads formed of a material selected from the group consisting of twisted nylon yarn, twisted polyester yarn, and twisted aromatic polyamide yarn.

9. The toothed belt of claim 1, wherein said weft of said inner fabric layer is constructed of threads formed of a material selected from the group consisting of twisted nylon yarn, twisted polyester yarn, and twisted aromatic polyamide yarn.

* * * * *